July 30, 1963

H. EHRICH ETAL 3,099,094

MEASURING INSTRUMENT AND METHOD AND MEANS FOR
DAMPENING THE OSCILLATION OF
A MEASURING MEMBER THEREOF

Filed Jan. 18, 1961

Inventors
Hans Ehrich and Martin Lässig
By: [signature]
Attorney

Inventors
Hans Ehrich and Martin Lässig
By: [signature]
Attorney

Inventors
Hans Ehrich and Martin Lässig
By: [signature]
Attorney

July 30, 1963　　H. EHRICH ETAL　　　3,099,094
MEASURING INSTRUMENT AND METHOD AND MEANS FOR
DAMPENING THE OSCILLATION OF
A MEASURING MEMBER THEREOF
Filed Jan. 18, 1961　　　　　　　　　　5 Sheets-Sheet 5

Inventors
Hans Ehrich and Martin Lässig
By:
Attorney

United States Patent Office 3,099,094
Patented July 30, 1963

3,099,094
MEASURING INSTRUMENT AND METHOD AND MEANS FOR DAMPENING THE OSCILLATION OF A MEASURING MEMBER THEREOF
Hans Ehrich, Schulensee, near Kiel, and Martin Lässig, Kiel-Hasseldieksdamm, Germany, assignors to Anschutz & Co. G.m.b.H., Kiel-Wik, Germany, a limited-liability company of Germany
Filed Jan. 18, 1961, Ser. No. 83,558
Claims priority, application Germany Jan. 20, 1960
18 Claims. (Cl. 33—226)

Our invention relates to a measuring instrument and to an improved method and improved means for opposing and dampening the oscillation of a measuring member thereof. More particularly, our invention is applicable to and relates to a gyroscopic compass provided with a gyroscope-supporting float susceptible of oscillation about the meridian plane and with improved means for dampening such oscillation.

It is the primary object of our invention to provide an improved method and means which will effectively oppose and dampen the oscillation within the shortest possible time without impairing the accuracy of operation of the instrument and without being affected in any way by a change of temperature.

Further objects of our invention are to provide simple and effective dampening means for the oscillating measuring member of the instrument, such dampening means requiring a minimum of space and being reliable in operation; to provide an improved method and means for dampening the oscillation of the measuring member of a measuring instrument without increasing the duration of the period of oscillation.

Further objects of our invention will appear from a detailed description of a number of embodiments of our invention following hereinafter with reference to the accompanying drawings. We wish it to be understood, however, that our invention is in no way restricted to such details and is capable of numerous modifications within the scope of the appended claims and that the terms and phrases used in such detailed description have been chosen for the purpose of explaining rather than that of restricting or limiting our invention.

In the accompanying drawings.

Figure 1:
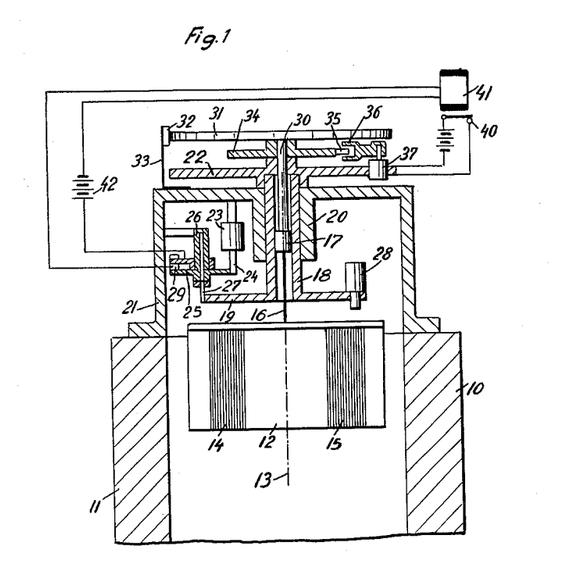
FIG. 1 is a vertical section taken through a measuring instrument having a measuring member for measuring the relative strength of two electrical currents, said measuring member being provided with our improved means for dampening its oscillation.

The stationary frame of the electrical measuring instrument illustrated in FIG. 1 comprises a permanent horseshoe magnet having parallel arms 10 and 11 causing a magnetic flux to flow horizontally through a core 12 which consists of a magnetizable material and is mounted between the arms 10 and 11 for rotation about a vertical axis 13 which extends parallel to and is equally spaced from the opposed faces of the arms 10 and 11. The core 12 has a substantially circular horizontal cross-sectional shape and is provided with a pair of coils 14 and 15, the windings of each coil extending parallel to a plane in which the axis 13 is located, the two planes of the windings 14 and 15 extending perpendicularly to each other. Each winding is provided with means not shown for supplying an electrical current thereto. The core 12 is suspended from an overhead structure by means of an elastic strip 16 which substantially coincides with the axis 13. If desired, the core 12 may be provided at its bottom with additional bearing means maintaining it in rotatable relationship to the frame coaxially with the axis 13.

The elements 12, 14 and 15 constitute a measuring member which always tends to assume a position of equilibrium in the magnetic field, such position depending on the ratio of the currents flowing through the windings 13 and 14. When this ratio is changed by variation of one or the other or both of the currents, the measuring member will swing towards and oscillate in another locus about a position of equilibrium.

It is necessary to prevent the strip 16 from being biased, when the measuring member assumes its position of equilibrium as otherwise this position would be affected by such bias. Therefore, the strip 16 is fixed to an anchor 17 which is mounted on a follow-up which is rotatable in the frame of the instrument coaxially with respect to the measuring member 12, 14, 15 so as to be able to follow and to catch up with the measuring member when suitably driven. For that purpose follow-up driving means are connected with the frame of the instrument and with the follow-up 18, 19, 22 to turn the follow-up and with it the anchor about its axis 13 relative to the measuring member 12, 14 and 15. These follow-up driving means, as provided in the embodiment shown, will now be described in detail. The anchor 17 and a tubular hub 18 of a friction wheel 19 are rotatably mounted in coaxial relationship to the measuring member 12, 14, 15 within a hollow neck 20 of a housing 21 which forms part of the frame of the instrument and is fixed upon the horseshoe magnet 10, 11. By means to be described later the anchor 17 and the tubular follow-up hub 18 are normally connected by means holding them in a predetermined rigid angular relationship. The tubular hub 18 projects upwardly from the neck 20 of the housing 21 and carries an indicating disk 22 provided with a suitable graduation whereby the angular position of the follow-up 18, 19, 22 may be read at any time.

The follow-up driving means include an electric follow-up motor 23 mounted in the interior space of and fixed to the housing 21, the rotor of the motor 23 being provided with a friction pin 24 frictionally engaging the periphery of a friction wheel 25 rotatably mounted in a bearing 26 formed by a bracket fixed to the internal wall of the housing 21. The lower section 27 of the shaft of the friction wheel 25 is in frictional engagement with the periphery of the friction wheel 19.

The follow-up motor 23 is a reversible electric motor which is controlled by suitable sensing mechanism which is coordinated to the follow-up 18, 19, 22 and to the measuring member 12, 14, 15 for detecting any angular positional disagreement between the follow-up and the measuring member. In the embodiment shown the sensing mechanism is diagrammatically indicated as a photoelectric device 28 mounted on the friction wheel 19 and cooperating with a suitable mark provided on the top face of the measuring member 12, 14, 15. The angular positional disagreement just referred to exists, when the mark is spaced from the axis of the device 28. As a result, this device produces a voltage which after suitable amplification is supplied to the follow-up motor 23 enabling same by means of the friction transmission 25, 27, 19 to rotate the follow-up 18, 19, 22 in such a direction as to reduce the angular positional disagreement to zero.

As photoelectrical sensing mechanisms, such as the device 28, are well known in the art and do not form part of our invention, a detailed description thereof may be dispensed with.

From the above it will be readily understood that the elastic strip 16 will be kept free of any torsional bias as long as the indicator disk 22 and the anchor 17 are coupled to each other in a predetermined mutual angular basic position. The strip 16 cannot be biased, unless the follow-up rotation of the anchor 17 stops, while the follow-up motion of the indicator disk 22 continues, thus causing a relative angular displacement between the anchor 17 and the rotating measuring member 12, 14, 15 about the axis 13.

For the purpose of opposing and dampening the oscillations which occur upon any change of the ratio of the currents energizing the windings 14 and 15 and upon the subsequent variation of the angular disposition of the directing force exerted by the flux upon the measuring member, we have provided additional control mechanism which is coordinated to the frame, to the follow-up and driving means 18, 19 and 22—27 and to the anchor 17 for temporarily arresting the latter causing it to stay behind the measuring member 12, 14 and 15, whereby the elastic means 16 will be biased and thus caused to oppose and to dampen the oscillation.

In the embodiment shown the anchor 17 is so controlled, as described hereinafter, as to be rendered operative to follow and catch up with the measuring member intermittently for a period of time shorter than half of the natural period of oscillation of the measuring member 12, 14, 15, the periods of operativeness commencing preferably, whenever the measuring element 12, 14, 15 reverses its oscillating movement. The detection of such reversal can be effected, for instance, by an electrical slip switch 29 comprising a pair of first contacts mounted in spaced positions on the friction wheel 25 and straddling a second contact mounted on an arm which is rotatably supported by the bracket carrying bearing 26, the axis of rotation of the arm of slip switch 29 coinciding with the axis of rotation of the friction wheel 25. While the friction wheel 25 continues to rotate in one direction, one of the first contacts will engage and carry along the second contact and the arm carrying it thus closing the slip switch. When the friction wheel 25, however, reverses its rotation, said second contact carried by the arm will be disengaged by the one first contact and thus the switch will be temporarily opened before it will be closed again by engagement of the other one of the first contacts with the second contact. The temporary opening of the slip switch supplies a control signal for a purpose to be described hereinafter.

We have provided the anchor 17 with an upwardly projecting stem 30 which extends through the hub of the indicator disk 22 and on its upper end section carries a brake disk 31 fixed to the stem 30 and cooperating with a brakeshoe 32 carried by a leaf-spring 33 fixed to the housing 21. The leaf-spring 33 is so biased as to keep the brakeshoe 32 in frictional engagement with the brake disk 31. For the purpose of disconnectably coupling the anchor 17 with the follow-up 18, 19, 22, the following means are provided: A cam disk 34 is located below the brake disk 31 and rigidly connected therewith and with the stem 30 so as to move in unison with the anchor 17. Therefore, the cam 34 and the brake disk 31 can be considered components of the anchor.

From the above it will appear that the indicator disk 22 constitutes a support for the anchor 17, 34, 31, whereas the hub of disk 22 is rotatably supported by the top of hub 18. A follower member in form of a cam roller 35 is mounted on a pivotal support on disk 22 for guided movement towards and away from the axis 13 and for engagement with the cam 34. In the embodiment shown such guidance of the follower member 35 is effected by an arm 36 which carries it and is pivotally mounted on the indicator disk 22 about a vertical pivot axis. Moreover, electromagnetic means 37 are mounted on the disk 22 for imparting inward movement to the arm 36 and the follower member 35 carried thereby. This electromagnetic means 37 may be formed by a rotary magnetic device of a kind which is well known in the art and does not require any detailed description. As long as the device 37 is deenergized, arm 36 is free to swing about its pivot and, therefore, permits rotation of the anchor including cam 34 relative to the support 22. When the winding of the device 37 is energized, however, it will swing the arm 36 and the follower member 35 carried thereby inwardly into engagement with the cam 34. This cam is so shaped that the inward movement of the follower 35 imparted by the electromagnetic means 37 urges the cam 34 into the predetermined angular position with respect to the support shown in FIG. 5. Preferably, the cam is heart-shaped, the point of its smallest radius forming the apex of a recess. Under the inward pressure exerted by the follower 35 the cam will turn into the position in which the follower 35 engages the recess.

The winding of the electromagnetic device 37 is energized by normally closed contacts 40 of a relay whose winding 41 is included in series with a source of current 42 and with the slip switch 29. Whenever the slip switch contacts are separated de-energizing the winding of the relay, the contacts 40 are closed immediately an energize the electromagnetic device 37 which presses the follower member 35 upon the periphery of the cam disk 34 thereby quickly turning the anchor 17 into positional registry with the follow-up and thereby with the measuring member 12, 14, 15 and, as a result, relaxing the elastic element formed by strip 16. The relay is time-controlled. While it responds to a de-energization of its winding 41 immediately, its response to a re-energization of its winding is delayed. Therefore, when the slip switch 29 is closed again after some reverse movement of the follow-up driving means, the relay contacts will not be opened again to de-energize the electromagnetic device 37 until the follower member 35 has had time to turn the cam disk 34 to the position shown in FIG. 5. Upon de-energization of the electromagnetic device 37 owing to re-energization of the relay, the cam 34 is freed from rotation with the follow-up disk 22, since the arm 36 is free to swing in clockwise direction with reference to FIG. 5. Therefore, the brakeshoe 32 will now arrest and hold the anchor 17 in stationary condition, while the driving means will continue to turn the follow-up 18, 19 and 22 into positional registry with the measuring member 12, 14 and 15.

From the above it will be understood that the switch 29 and the relay 40, 41 constitute additional control mechanism which is controlled by change of direction of motion of the measuring member and follow-up relative to the frame for temporarily immobilizing the anchor by permitting it to be arrested by the brakeshoe 32 and uncoupled from the follow-up, the interval of immobilization terminating after the measuring member 12, 14, 15 and the support 22 following up its motion reverse their motion relative to the frame. During the interval of immobilization the spring 16 opposes and counteracts the rotation of the measuring member 12, 14 and 15.

Figure 5:
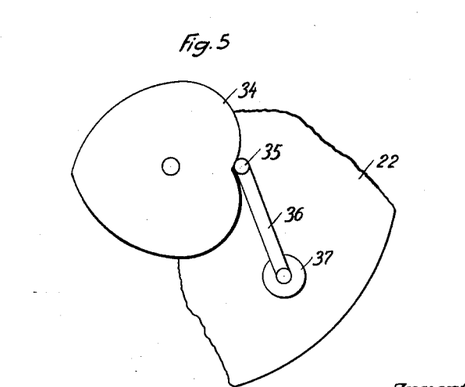
FIG. 5 is a plan view of a cam and a follower member shown in section in FIG. 1.

The period of time which the electromagnetic device 37 requires to effect the inward movement of the follower member 35 and to turn the cam 34 into the position shown in FIG. 5 is but a small fraction of the natural period of oscillation of the measuring member 12, 14, 15. Therefore, upon reversal of the oscillatory motion of the measuring member 12, 14, 15 the spring 16 will be relaxed so quickly that it has practically no time to accelerate the measuring member upon such reversal.

Preferably, the spring strip 16 has a characteristic causing it, when the angular positional disagreement between the anchor 17 and the measuring member 12, 14, 15 amounts to an angle α, to exert the same torque upon the measuring member as the magnetic flux exerts upon the measuring member, when the latter is displaced from its position of equilibrium by the angle α. In other words, the spring 16 is preferably so dimensioned that the torque it exerts upon the measuring member depends to the same extent on the relative angular movement between the anchor 17 and the measuring member as the directional force exerted by the magnetic field upon the measuring member depends on the relative rotation of the latter to the flux.

Figure 3:
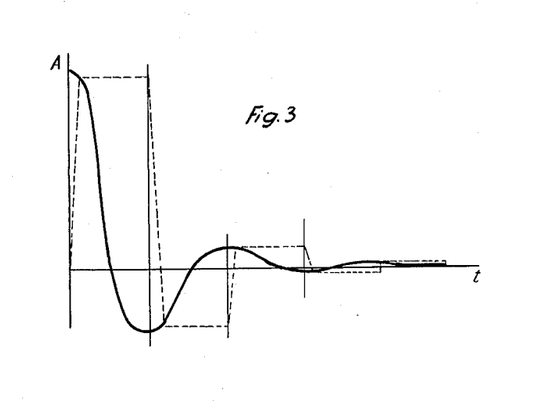
Figure 4:
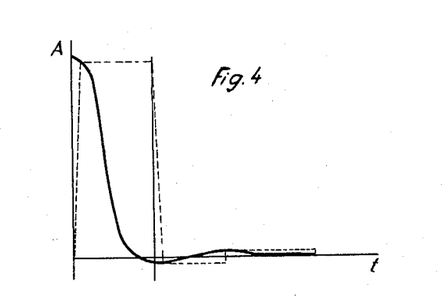

The operation of our novel means for opposing and dampening the oscillation of the measuring member will now be explained with reference to FIGS. 2, 3 and 4 in which the ordinates represent the angle of displacement of the measuring member and the anchor 17 each relative to the direction of the directional force, while the abscissae represent the time. The full lines refer to the measuring member and the dotted lines refer to the anchor.

Let it be assumed that the measuring member 12, 14, 15 has any desired angular position and, under the influence of the directional force exerted by the magnetic flux, performs an oscillation relative to the frame 21 in a predetermined locus. In the instant of reversal of such oscillation the slip switch 29 opens thus emitting the control signal, whereupon the magnetic device 37 is energized, moving the follower roller 35 into the position shown in FIG. 5, thereby quickly turning the anchor 17 into angular registry with the momentaneous position of the indicator disk or support 22, thus relaxing the elastic strip 5. The delay period having been so predetermined, substantially immediately thereafter the relay contact 40 opens again de-energizing the electromagnetic device 37. Therefore, the follower roller 35 will no longer exert any pressure upon the cam 34. Therefore, the cam and the brake disk 31 fixed thereto will be held in stationary position by the brakeshoe 32. The follow-up motor 23, however, acting under control by the sensing means 28 continues to impart follow-up motion to the indicator disk 22 and to the electromagnetic device 37 mounted thereon, causing these elements to remain in angular registry with the oscillating measuring member 12, 14, 15. Owing to the oscillation of this member, the elastic strip 16 is biased again. As a result, it will withdraw kinetic energy from the measuring member, thus retarding the latter.

The best dampening result will be attained if this retardation causes the oscillating measuring member to stop and to reverse its motion at the very instant in which the measuring member arrives at its zero position determined by the directional force. In this instant the slip switch 29 is opened, again causing energization of the electromagnetic device 37 for a period of time sufficient to enable it to impart quick rotation to the anchor elements 17, 34 and 31 to the position shown in FIG. 5 contrary to the frictional force exerted by the brake shoe 32. In FIG. 2 this quick follow-up motion produced by the electromagnetic device 37 is indicated by the substantially vertical dotted line. Upon termination of this high speed follow-up motion the electromagnetic device 37 is de-energized again. The measuring member 12, 14, 15 will remain in its position until the directional force changes, thus initiating a new oscillation.

From the above it will be understood that our novel method of opposing and dampening the oscillation about the axis 13 relative to the stationary frame of the measuring member 12, 14, 15 connected by the spring 16 to the anchor 17 mounted on the frame for rotation about the axis 13 comprises the steps of imparting to the anchor 17 an intermittent rotary motion of an angular velocity higher than that of the measuring member, said rotary motion being effected for such periods and in such direction as to cause the anchor 17 to catch up with the measuring member and the step of arresting the anchor 17 relative to the frame between the periods of the intermittent rotary motion for intervals amounting to a fraction of the period of oscillation, thereby intermittently biasing the spring 16 in a sense opposite to the oscillation. The periods in which the anchor 17 is put in motion by the electromagnetic device are preferably commenced whenever the measuring member reverses its oscillation. The intervals of intermittent arrest of the anchor 17 by the brake shoe 32 are terminated whenever the oscillating measuring member reverses its oscillation so that the anchor 17 will catch up with the measuring member 12, 14, 15 when the same reverses its oscillation.

Figure 2:
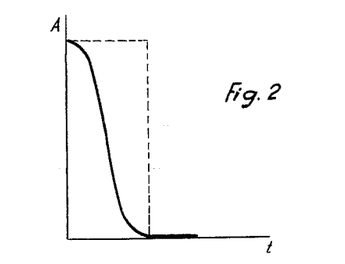
FIGS. 2, 3 and 4 are graphs showing the oscillation of the measuring member.

The dampening effect illustrated in FIG. 2 represents the ideal case which will occur under exceptional conditions only. In this ideal case it has been assumed that the period of operation of the electromagnetic device 37 for turning the cam 34 and the anchor 17 rigid therewith into angular registry with the indicator disk 22 and the measuring member 12, 14, 15 is so short that it can be disregarded. For this reason the broken line representing the follow-up movement of the anchor 17 is shown as a vertical line. In FIGS. 3 and 4 it has been assumed that the period of operation of the electromagnetic device 37 is substantial even though it amounts to a small fraction only of the natural period of oscillation. Therefore, the broken lines representing the follow-up movement of the anchor 17 are somewhat inclined rather than vertical. FIG. 4 represents a dampening effect which we have attained in practice and which we consider excellent. As stated hereinabove, it is desirable that the characteristic of the directional force exerted by the flux upon the measuring member, i.e. the change of the torque exerted by the directional force when the measuring member is turned through an angle α, should equal the stiffness of the spring 16. Under these conditions the angular motion of the measuring member will be so influenced by the bias of the spring that it will reach its reversal point when arriving in its zero position. When upon such reversal the anchor 17 completes its following movement in a very short period of time, the measuring member will come to rest in its zero position.

As is well known, the duration of the period of oscillation of an oscillating system depends on both the momentum of the mass of the oscillating element and on the stiffness of the spring. In the instant case the stiffness of the spring is composed of the variation of the directional torque and of the variation of the bias of the spring 16. Because of the increased total spring force, the period of oscillation will be shortened in contradistinction to the conventional dampening methods. Therefore, according to our invention, the dampening effect will be not only powerful but will also result in a reduction of the period of oscillation. Hence, it is the purpose of the quick intermittent brief follow-up movement of the anchor 17 produced by the cooperation of the follow-up motor 23 and the electromagnetic device 37 to gain time for temporarily arresting the follow-up movement of the anchor 17 and to thereby bias the torsional spring 16 subsequently eliminating this bias as quickly as possible. The period of operativeness of the electromagnetic device 37 depends on the ratio of the follow-up speed of the anchor 17 to the natural period of oscillation of the measuring member. The follow-up movement produced by the brief operativeness of the electromagnetic device 37 shall have an angular extent substantially equaling the positional disagreement between the anchor 17 and the measuring member caused by the intermittent arresting of the anchor 17. If we would keep the anchor 17 in positional registry with the measuring member for a longer period of time, the torsional spring 16 would not be biased during this period and, as a result, the oscillation would not be dampened during this period. The duration of the period of energization of the device 37 depends on the torque exerted by this device, on the momentum of the unit composed of elements 17, 30, 31 and 34 and on the momentum of the elements 35, 36. If the speed of the follow-up motion of the anchor 17 relative to the measuring member is proportional to the positional angular disagreement of these elements, the desired follow-up movement will be substantially attained, if the duration of the follow-up movement of the anchor 17 is invariable for all amplitudes of oscillation.

Alternatively, we may vary the duration of the intermittent follow-up movement of the anchor 17 in dependence on the amplitude of the oscillation of the measuring member in order to ensure the desired effect. This means that with larger amplitudes the period of the intermittent follow-up movement is extended compared with the period for small amplitudes of oscillation. Preferably, the amplitude of oscillation is represented by the voltage produced by the sensing mechanism 28, because the speed of motion and the lag of the follow-up tend to be greater at greater amplitudes of oscillation. We have found, for instance, that where the natural period of oscillation of the measuring member amounts to five minutes, excellent results are attained, if the period of energization of the electromagnetic device 37 amounts to .2 second.

Figure 6:
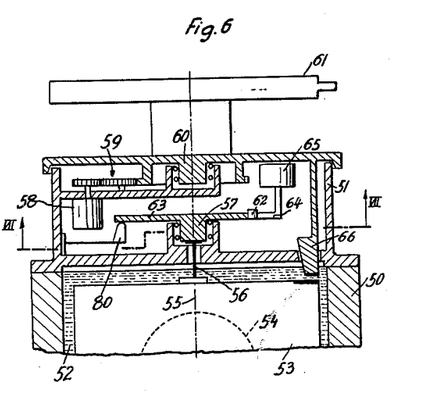
FIG. 6 is a sectional view of the upper portion of a gyroscopic compass, the section being taken along the vertical plane indicated by the line VI—VI in FIG. 7.
Figure 7:
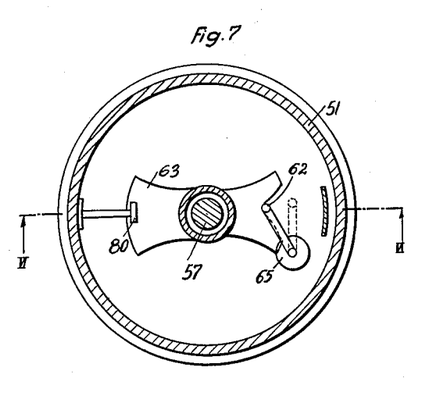
FIG. 7 is the horizontal section taken along the line VII—VII of FIG. 6.

In FIGS. 6 and 7 we have illustrated our invention as applied to a gyroscopic compass for terrestrial purposes substantially as disclosed in the co-pending application Serial No. 17,094 by Johannes Hintze and Hans Ehrich on March 23, 1960.

A stationary container 50 including a cover in form of a substantially cylindrical housing 51 is filled by an electrically conductive liquid 52 in which a hollow float 53 is submerged. A gyroscope 54 is journaled within the interior space of the float 53 for rotation about a substantially horizontal axis in bearings which are fixed to the float 53, the axis of rotation extending perpendicularly to the vertical axis 55 of the float. The container 50, 51 and the float 53 have a shape affording freedom for relative rotation about the axis 55. Preferably, they are cylindrical. The center of gravity of the float 53 and the elements carried thereby including the gyroscope 54 are located below the center of buoyancy of the float which is suspended by an elongate torsional spring in form of an elastic strip 56 from an anchor 57 mounted on the bottom of housing 51 for rotation about the axis 55. The elastic strip 56 is fixed to the anchor 57 and to the float 53 for suspending the latter from the follower. An electrical follow-up driving means is formed by a motor 58 mounted on the housing section 51 of the container and by a transmission 59 composed of friction wheels geared to the follow-up motor 58 and to the anchor 57 by means to be now described in detail. The follow-up means include a support 60 which is mounted on the housing section 51 of the container to be rotatable about the axis 55, is geared to the transmission 59 shown at greater detail in FIG. 8 and carries an optical instrument 61, such as a theodolite, for the purpose of taking bearings.

Figure 9:
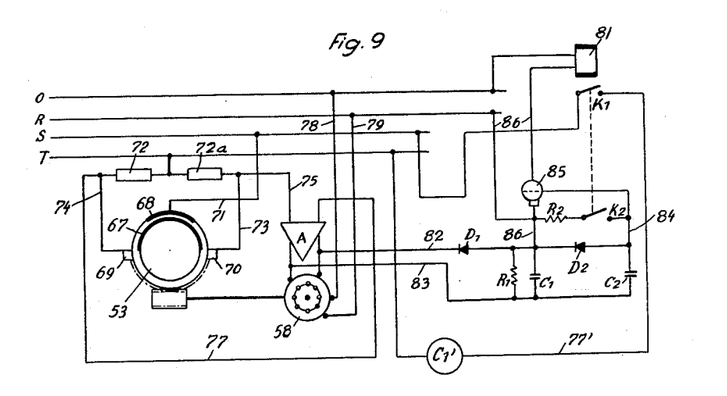
FIG. 9 shows a diagrammatical plan view of electrolytic sensing mechanism for detecting positional disagreement between the float and the housing of the compass shown in FIG. 6 and electrical circuit means connected therewith for controlling the follow-up, FIG. 10 modified means for controlling the follow-up, FIG. 11 an electrical circuit diagram of a third modification of additional control mechanism provided for the follow-up, and FIG. 12 a graph illustrating a control voltage and its dependency upon positional disagreement between the float and the housing of the compass.

Moreover, a follower member, such as a cam roller 62 is mounted on the support 60 for guided movement towards and away from the axis 55 and for engagement with a heart-shaped cam 63 provided on the anchor 57. The guided movement of the follower roller 62 is afforded by a pivotal arm 64 which carries the roller 62 and is fixed to the rotor of an electromagnetic device 65 similar to the electromagnetic device 37 described with reference to FIG. 1. For the purpose of sensing the angular relationship of the support 60 to the float 53 suitable sensing mechanism is provided which in FIG. 6 is diagrammatically indicated at 66 as inductive means. Preferably, however, this sensing mechanism comprises opposed electrodes mounted on the float 43 and on a spider depending from support 60 into container 50 and electrically connected to a Wheatstone bridge circuit producing a voltage proportional to the positional disagreement between the support 60 and the float 53. In FIG. 9 we have diagrammatically indicated a plan view of the float 53 provided with a semi-circular electrode strip 67. The support 60 carries an opposed electrode strip 68 and, in spaced relations thereto, a pair of diametrically opposed electrodes 69 and 70. Lines R, S, T connected to a source of three-phase alternating current and a ground line O serve to supply electrical power. A wire 71 connects line S with the electrode strip 68. A pair of equal inductive resistors 72 and 72a have their adjacent terminals connected to the line T while the opposed terminals are connected by wires 73 and 74 to the electrodes 69 and 70. The input of an amplifier A has one terminal connected by wire 75 to wire 73 and has its other terminal connected by wire 77 to wire 74.

The output of the amplifier A is connected to one phase winding of the two-phase follow-up motor 58, whereas its other phase winding is connected by wires 78 and 79 to the leads R and O.

Figure 12:
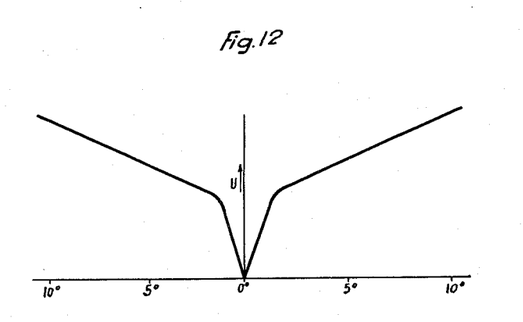

As long as the support 60 and the electrodes 69 and 70 carried thereby are in angular registry with the float 53 and the electrode strip 67 carried thereby, as shown in FIG. 9, the diagonal points at 73 and 74 of the Wheatstone bridge circuit will have equal potentials. Therefore, the voltage at the input of the amplifier A is zero and no electrical current will be supplied to the upper phase winding of motor 58. Hence, this motor is at rest. As soon, however, as a positional disagreement develops between the support 60 and the float 53, the resistance offered by the electrolyte to the flow of current between the electrodes 67 and 69 will become different from the resistance offered by the electrolyte to the flow of current between the electrodes 67 and 70. Therefore, the equilibrium of the Wheatstone circuit will be disturbed and a voltage will appear between lines 71 and 74 causing current to be supplied by the amplifier to motor 58. FIG. 12 indicates the change of such voltage in dependence on the angular disagreement. As a result, motor 58 will commence to rotate in such a sense as to reduce the positional disagreement between support 60 and float 53 to zero.

A brake shoe 80 engages the cam 63 maintaining it in stationary condition as long as the electromagnetic device 65 is de-energized.

In this embodiment the additional control mechanism responsive to a reversal of the movement of the anchor 57 is formed by a circuit which is connected to the amplifier A and includes a relay 81 and is responsive to a decrease of the voltage between wires 73 and 74 to zero so as to actuate the relay whenever such voltage becomes zero, the relay having contacts connected with the electromagnetic device 65 forming part of the follow-up driving means.

More particularly, a capacitor C1 is connected by wires 82 and 83 to the output of the amplifier A via a rectifier D1. A second capacitor C2 is shunted across the capacitor C1 via a second rectifier D2. As long as an input voltage is supplied to the amplifier A, the two capacitors C1 and C2 will be charged simultaneously to the same potential. The potential of the capacitor C2 is supplied by a wire 84 to the grid of a vacuum tube 85, while the potential of the capacitor C1 is supplied by wire 86 to the cathode of this tube. As long as both potentials are equal, a plate current flows through this tube in a circuit 86 in which the winding of relay 81 is inserted opening its normally closed contact K1. When the float 53 reverses its oscillation about the meridian, however, it will temporarily reach angular registry with the support 60 causing the voltage supplied to the input of amplifier A to become zero. When that happens, the capacitor C1 will be discharged via a resistor R1 shunted thereacross, whereas the capacitor C2 retains its potential. As a result, the plate circuit 86 will be blocked by the vacuum tube, thus de-energizing relay 81 and closing its contact K1. This contact is included in a circuit 77' together with a controller C1' which controls energization and de-energization of the electromagnetic device 65 which may be supplied with three-phase current but has not been shown in FIG. 9.

The relay 81 is of a type which responds immediately to a de-energization but has a delayed response to energization. Therefore, contact K1 will remain closed for a period of time sufficient to permit complete operation of the electromagnetic device 65. As stated hereinabove, a period of time of .2 second will be sufficient for that purpose, where the normal period of oscillation of the float 53 amounts to five minutes.

A second normally closed contact K2 of relay 81 serves to discharge capacitor C2 via a resistor R2. The resistance of R2 determines the period of discharge and thus the holding period of relay 81. When the two capacitors C1 and C2 have been re-charged to equal potentials, the plate current will start flowing again through winding of relay 81.

Figure 6A:
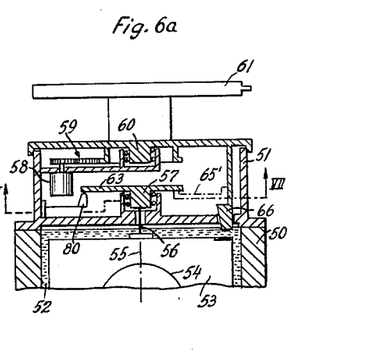
FIG. 6a is a view, similar to FIG. 6, of a modified structure.
Figure 8:
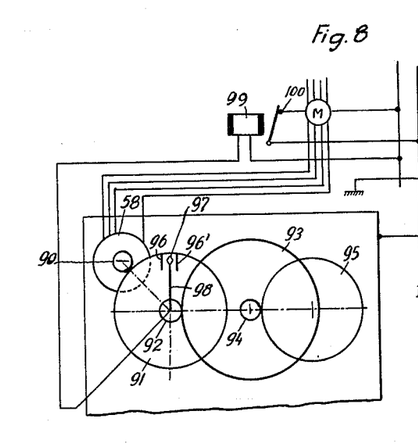
FIG. 8 is a plan view of the follow-up shown in section in FIG. 6 provided with an electrical switch responsive to a reversal of the follow-up movement and with an electrical circuit including such switch.

If desired, the electromagnetic device 65 in FIG. 6 may be omitted and the anchor 57 may be rigidly connected with the support 60. This modification is shown in FIG. 6a. Here coupling means 65' rigidly attaches anchor 57 to support 60. In that event, however, the follow-up motor 58 must be so powerful as to be capable of re-establishing positional registry between the measuring member 53 and the anchor 57 within a very short period of time amounting but to a small fraction of the natural period of oscillation. In such modification, the circuit diagram shown in FIG. 9 would require that the switch K1 be included in lead 77 rather than in lead 77', so that the additional control mechanism will control the driving means 58, 59. The transmission 59 in FIG. 6 could be provided with a slip switch similar to switch 29 for controlling the intermittent energization of follow-up motor 58. Such a slip switch is illustrated in FIG. 8 in which the follow-up motor 58 is shown as operating a friction pinion 90 engaging a friction wheel 91 which is rigidly connected with a coaxial friction pinion 92 which engages a friction wheel 93. This wheel has a coaxial friction pinion 94 which engages a friction wheel 95 rigidly and coaxially connected with the support 60. The slip switch comprises a pair of contacts 96, 96' mounted in spaced relationship on the friction wheel 91 and straddling with clearance a third contact 97 carried by an arm 98 whose supporting shaft extends through pinion 92 and friction wheel 91 and engages a brakeshoe not shown mounted on the housing. This brakeshoe tends to hold arm 98 and contact 97 stationary but permits contact 97 to be carried along by contact 96 or contact 96'. Whenever the direction of rotation of friction wheel 91 is reversed, the contact 97 is temporarily disengaged from contact 96 or 96', whereby a circuit through a relay 99 is interrupted permitting contact 100 to close and to energize a controller M which in its turn supplies motor 58 with electrical energy to create an overswing of the follow-up and anchor such as to insure, over a sufficient initial part of the back swing of the measuring member, an opposing spring torsion effective to substantially damp it. The relay 99, 100 is of a type in which its armature responds to a de-energization immediately but responds to a re-energization with a certain delay permitting the follow-up motor 58 to be operated for a period of time sufficient to eliminate positional disagreement and bias of spring 56.

Means may be provided to control the period of energization of the follow-up motor 58 in proportion to the amplitude of the oscillation of the measuring member. This would mean that with larger amplitudes the follow-up motor is intermittently operated for longer periods of time than with small amplitudes.

Figure 10:
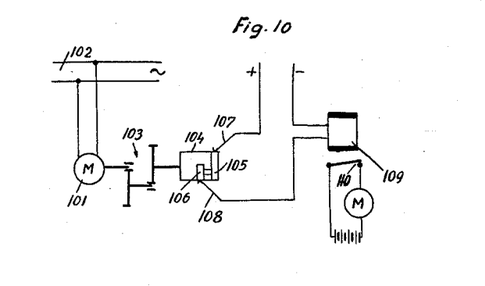

Moreover, the additional control means coordinated to the follow-up driving means and to the frame for temporarily arresting the anchor relative to the follow-up may be so constructed that the periods of motion of the anchor are of predetermined equal duration and that the intervals of arrest therebetween are likewise of predetermined equal duration. A controlling device for that purpose will now be described with reference to FIG. 10. An electric motor 101 connected to any suitable source of power 102 drives a speed-reducing transmission 103 which, in its turn, rotates a cylinder 104 about its axis at a comparatively slow speed. The cylinder is provided with two electrically connected conductive strips 105 and 106. While strip 105 extends around the entire periphery of the cylinder 104, strip 106 extends through 180° only of the periphery. Each strip cooperates with a stationary brush 107, or 108 respectively. A circuit extends from the positive terminal of a suitable source of control current through brush 107, strips 105 and 106, brush 108 and winding of relay 109 to the negative terminal. As a result, the relay 109 will be intermittently energized for periods of predetermined equal duration. The intervals are likewise of a predetermined equal duration and depend on the peripheral length of strip 106. The relay contact 110 is placed in circuit with a controller M which controls either the follow-up motor, if the anchor, such as 57, is permanently rigidly connected with the support, such as 60, or the electromagnetic device, such as 37 or 65.

Figure 11:
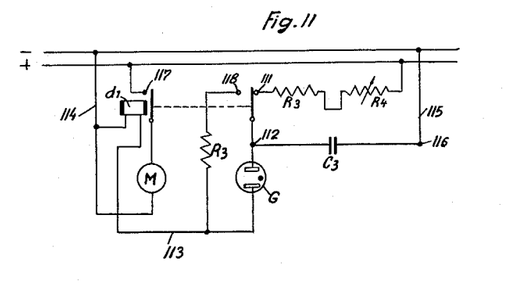

In FIG. 11 we have illustrated electric control means functioning in a similar manner. A capacitor C3 is included in a circuit in series with a constant resistor R3, a variable resistor R4 and a normally closed contact 111 of a relay d1. Upon de-energization of the coil of this relay the capacitor C3 is charged over a certain interval of time until it reaches an electrical potential rendering a glow discharge tube G conductive. As a result, the capacitor C3 will be discharged by a powerful current flowing from terminal 112 of the capacitor through the glow discharge tube G, via 113, winding of relay d1, and wires 114 and 115 to the other terminal 116 of the capacitor C3. As a result, the relay d1 will attract its armature and will open contact 111 and close contacts 117 and 118. Contact 117 connects controller M to the source of control current and this controller will function as above described with reference to FIG. 10. Contact 118 permits continued discharge of the capacitor C3 via a resistor R3, after the glow discharge tube will have become non-conductive, until the potential of capacitor C3 will be insufficient to keep coil d1 energized. Thereupon the relay contacts will be shifted to the position shown in FIG. 11, thus repeating the cycle of operation.

The periods of intermittent motion of the anchor, such as 17 or 57, will be preferably made ½ or ¼ of the natural period of oscillation of the measuring member. When the first intermittent motion of the anchor will commence on the first reversal of the oscillation of the measuring member, the subsequent intermittent motions of the anchor will commence substantially on passage of the measuring member through its zero position and on the next reversal, that is to say in the most favorable instant.

The dampening effect can be varied by varying the stiffness of the torsional spring or by varying the periods and intervals of the follow-up movement.

Our invention is applicable to all kinds of instruments in which a measuring member subject to a directional force performs an oscillation about a zero position. Examples of such instruments are those illustrated in FIGS. 1 and 6, magnetic compasses, gyroscopic compasses, weighing instruments and the like. Also, our invention is not restricted to such measuring instruments in which the oscillation of the measuring member is of a rotary nature.

From the above it will appear that our invention provides for dampening the oscillations in a very effective manner without introducing any friction of the oscillating measuring member, without influencing its zero position, without being affected by changes of temperature and without exerting any undesirable forces upon the measuring member or its bearings. The simultaneous attainment of all of these objects has not been possible heretofore.

From the foregoing it will be seen that this invention is one well adapted to attain all of the ends and objects hereinabove set forth, together with other advantages which are obvious and which are inherent to the combination.

While the invention has been described in connection with a number of preferred embodiments thereof, it will be understood that it is capable of further modification, and this application is intended to cover any variations, uses, or adaptations of the invention following, in general, the principles of the invention and including such departures from the present disclosure as come within known or customary practice in the art to which the invention pertains, and as fall within the scope of the invention or the limits of the appended claims.

What we claim is:

1. In a measuring instrument, the combination comprising a frame, a measuring member mounted therein to oscillate relative to said frame in a predetermined locus and subject to a force tending to move it into a predetermined position within said locus, an anchor mounted in said frame for oscillation substantially in said locus, an elastic element connecting said measuring member with said anchor, a follow-up movable relative to said frame and connected with said anchor to produce movement of said anchor relative to said measuring member, sensing mechanism coordinated to said follow-up and to said measuring member for detecting positional disagreement within said locus therebetween, driving means controlled by said sensing mechanism and coordinated to said frame and to said follow-up to move the latter relative to said frame causing it to reduce said positional disagreement to zero, and additional control mechanism coordinated to said frame, said follow-up and to said anchor for temporarily arresting the later to thereby bias said elastic element causing it to oppose and to dampen the oscillation of said measuring member relative to said frame.

2. In a measuring instrument the combination comprising a frame, a measuring member mounted therein to be rotatable relative to said frame about an axis and subject to a force tending to move it into a predetermined angular position whereby said member owing to its mass will perform an oscillation about said position, said oscillation having a natural period, an anchor and a follow-up both rotatably mounted in said frame coaxially with respect to said measuring member, means for coupling said anchor with said follow-up for common rotation, an elastic element connecting said measuring member with said anchor, sensing mechanism coordinated to said follow-up and to said measuring member for detecting angular positional disagreement therebetween, driving means controlled by said sensing mechanism and coordinated to said frame and to said follow-up to rotate the latter relative to said frame causing it to reduce said angular positional disagreement to zero, and additional time-controlled control mechanism coordinated to said follow-up and to said anchor for so controlling at least one of said means as to intermittently arrest said anchor relative to said frame for an interval shorter than said natural period to thereby bias said elastic element causing it to oppose and to dampen said oscillation.

3. The combination claimed in claim 2 in which said measuring member is suspended from said anchor by said elastic element.

4. In a gyroscopic compass for terrestrial purposes, the combination claimed in claim 3 in which said measuring member is constituted by a float submerged in a liquid and enclosing a gyroscope rotor journaled in said float.

5. In a measuring instrument, the combination comprising a frame, a measuring member mounted therein for rotation about a vertical axis and subject to a force tending to move it into a predetermined angular position about said axis, whereby said measuring member owing to its mass will perform an oscillation about said position, an anchor and a follow-up both rotatably mounted in said frame coaxially with respect to said measuring member, means for coupling said anchor with said follow-up for common rotation, an elastic element connecting said measuring member with said anchor, sensing mechanism coordinated to said follow-up and to said measuring member for detecting angular positional disagreement therebetween about said axis, driving means controlled by said sensing mechanism and coordinated to said frame and to said follow-up to rotate the latter relative to said frame causing it to reduce said positional disagreement to zero, and additional control mechanism coordinated to said frame, to said follow-up and to said anchor and responsive to a reversal of the movement of said follow-up relative to said frame for so controlling at least one of said means as to intermittently arrest said anchor relative to said frame for a substantial interval not exceeding half the period of said oscillation, said interval terminating with said reversal, whereby during said interval said elastic element will be biased causing it to oppose and to dampen said oscillation.

6. In a measuring instrument, the combination comprising a frame, a measuring member mounted therein for rotation about a vertical axis and subject to a force tending to move it into a predetermined angular position about said axis, whereby said measuring member owing to its mass will perform an oscillation about said position, an anchor and a follow-up both rotatably mounted in said frame coaxially with respect to said measuring member, means for coupling said anchor with said follow-up for common rotation in a predetermined relative angular position, an elastic element connecting said measuring member with said anchor, sensing mechanism coordinated to said follow-up and to said measuring member for detecting angular positional disagreement therebetween about said axis, driving means controlled by said sensing mechanism and coordinated to said frame and to said follow-up to drive the latter relative to said frame causing it to reduce said positional disagreement to zero, and additional control mechanism coordinated to said frame, to said follow-up and to said anchor for so controlling at least one of said means as to intermittently arrest said anchor relative to said frame for predetermined intervals having a predetermined magnitude of a fraction of the period of said oscillation.

7. Method of opposing and dampening the oscillation about an axis relative to a stationary frame of a measuring member supported by a spring from an anchor mounted on said frame for rotation about said axis, which method comprises imparting to said anchor an intermittent rotary motion of an angular velocity higher than that of said measuring member, said intermittent rotary motion being effected for such periods and in such direction as to cause said anchor to catch up with said measuring member, and arresting said anchor relative to said frame between the periods of said intermittent rotary motion for intervals amounting to a fraction of the period of oscillation of said measuring member, thereby intermittently biasing said spring in a sense opposite to said oscillation.

8. Method as claimed in claim 7 in which said periods during which said anchor is in motion are commenced whenever said measuring member reverses its oscillation.

9. The method claimed in claim 8 in which said intervals of intermittent arrest of said anchor are terminated when said oscillating measuring member reverses its oscillation so that said anchor will catch up with said measuring member when the same reverses its oscillation.

10. The method claimed in claim 7 in which said periods are of predetermined equal duration and in which said intervals are of predetermined equal duration.

11. The combination claimed in claim 2 in which said elastic element is a spring having a characteristic causing it, when said angular positional disagreement amounts to a certain angle to exert the same torque upon said measuring member as said force exerts upon said measuring member, when the latter is displaced from said predetermined angular position by said certain angle.

12. The combination claimed in claim 2 in which said means for coupling is disengageable, said combination further comprising braking means mounted on said frame and coordinated to said anchor for arresting the latter relative to said frame, said additional control mechanism being operative to disengage said coupling means for temporarily arresting said anchor.

13. The combination claimed in claim 2 in which said anchor includes a brake disk, said follow-up includes a support rotatable about said axis, and said means for coupling comprise a cam on said anchor, a follower member mounted on said support for guided movement towards and away from said axis and for engagement with said cam, and electromagnetic means on said support for imparting said movement to said follower member, said cam being so shaped that movement of said follower member imparted by said electromagnetic means urges said cam into a predetermined angular position with respect to said support, said electromagnetic means being electrically connected with said additional control mechanism to be controlled thereby.

14. The combination claimed in claim 5 in which said additional control mechanism responsive to a reversal of the movement of said follow-up includes a switch composed of relatively rotatable contacts, one of said contacts being geared to said follow-up, frictional arresting means being coordinated to the other one of said contacts.

15. The combination claimed in claim 5 in which said sensing mechanism is formed by electrical means for producing a voltage commensurate with said positional disagreement, said additional control mechanism responsive to a reversal of the movement of said follow-up being formed by a circuit which is connected to said electrical means and includes a relay and is responsive to a decrease of said voltage to zero so as to actuate said relay, when said voltage becomes zero, said relay having contacts connected with said driving means for controlling the same.

16. A stationary gyroscopic compass for terrestrial purposes comprising a container, an electrically conductive liquid filling said container, a float in said liquid, said container and said float having a shape affording freedom for relative rotation about a vertical axis, a gyroscope carried by said float with its axis of rotation in horizontal position, the center of gravity of said float and the elements carried thereby including said gyroscope being located below the center of buoyancy of said float, a support mounted on top of said container for rotation about said axis, an anchor on said support, an elongate torsional spring extending along said axis between and fixed to said anchor and said float for suspending the latter from said anchor, a motor mounted on said container, a transmission geared to said motor and to said support to impart rotation to the latter, opposed electrodes mounted on said float and on said support in contact with said liquid, a source of current, a Wheatstone bridge circuit including said opposed electrodes and connected to said source of current and to said motor for supplying electric power thereto operating said motor in a direction tending to move said float into a predetermined angular position with respect to said support, a cam on said anchor, a follower member mounted on said support for guided movement towards and away from said axis and for engagement with said cam, electromagnetic means on said support for imparting said movement to said follower member, said cam being so shaped that movement of said follower member imparted by said electromagnetic means urges said cam and said anchor into a predetermined angular position with respect to said support, and electrical control means connected with said electromagnetic means for intermittently energizing the latter.

17. The combination claimed in claim 2 in which said additional control mechanism comprises a controller for said driving means and timing means for intermittently energizing and de-energizing said controller for predetermined periods of time amounting to less than one fourth of the period of said oscillation.

18. In a measuring instrument, the combination comprising a frame, a measuring member mounted therein for rotation about a vertical axis and subject to a force tending to move it into a predetermined angular position about said axis, whereby said measuring member owing to its mass will perform an oscillation about said position, a follow-up and an anchor both rotatably mounted in said frame coaxially with respect to said measuring member, means for coupling said anchor to said follow-up, an elastic element connecting said measuring member with said anchor, driving means connected with said frame and with said follow-up to turn said follow-up relative to said frame, a sensing mechanism coordinated to said follower frame and to said measuring member for detecting angular positional disagreement therebetween about said axis and for producing a voltage commensurate with said positional disagreement, an amplifier having its input connected to said sensing mechanism to be controlled by said voltage and having its output connected with said driving means to cause the latter to reduce said positional disagreement to zero, an electrical circuit including a capacitor and connected with the output of said amplifier and responsive to a reduction of said voltage to zero, and a control mechanism connected to said circuit for actuation concomitantly with the reduction of said voltage to zero and controlling one of said means for temporarily rendering the same incapable of turning said anchor.

References Cited in the file of this patent

UNITED STATES PATENTS

| | | |
|---|---|---|
| 1,671,584 | Henderson | May 29, 1928 |
| 1,924,688 | Anschutz-Kaempfe | Aug. 29, 1933 |
| 2,286,641 | Pavda | June 16, 1942 |
| 2,449,476 | Harrison | Sept. 14, 1948 |
| 2,806,610 | Goertz | Sept. 17, 1957 |

FOREIGN PATENTS

| | | |
|---|---|---|
| 245,546 | Great Britain | Jan. 14, 1926 |
| 917,608 | France | Sept. 16, 1946 |